Patented Apr. 7, 1936

2,036,301

UNITED STATES PATENT OFFICE 2,036,301

WAX COMPOSITION

Henry J. Rose, Philadelphia, Pa., assignor to The Atlantic Refining Company, Philadelphia, Pa., a corporation of Pennsylvania No Drawing. Application April 12, 1933, Serial No. 665,743

2 Claims. (Cl. 134—15)

My invention relates to a form of hydrocarbon wax, particularly wax derived from petroleum.

In accordance with my invention rubber in small quantities is added to wax to improve its physical characteristics.

Commercial petroleum waxes may be generally classified as paraffin wax or petrolatum. The former consists of the lower boiling waxes, is substantially oil-free and is relatively hard and brittle; the latter comprises the higher boiling waxes, contains relatively large amounts of oil and is semi-solid in consistency.

Paraffin wax is generally prepared by chilling and filtering the oil-wax mixture; petrolatum, however, due to the smallness of the crystals cannot be satisfactorily filtered and is separated by diluting with a low viscosity solvent, chilling and allowing the petrolatum to settle by gravity with or without mechanical assistance, as a centrifugal separator.

There may also be obtained, however, from petrolatum or similar waxy materials from petroleum by removal of its oil content, a hard high melting wax, substantially oil-free. Such substantially oil-free waxes are included in the broader designation "petroleum wax", but are not commonly known as "paraffin wax", which is also included in the broader term "petroleum wax."

The addition of rubber to petroleum waxes imparts desirable characteristics thereto, such as decreasing the brittleness and increasing the toughness of the wax.

Paraffin wax is used for many purposes, including preparation of waxed paper, as a coating for water-proofing or insulating fabrics, etc. Ordinary paraffin wax has the disadvantage that when a flexible material coated with it is bent the wax coating, being relatively brittle cracks, thus destroying the film and allowing moisture, air, etc., to enter. This type of wax is particularly improved by the addition thereto of rubber since one result is a decrease in its brittleness and the wax is thereby made more suitable for impregnating and coating flexible materials.

I prefer to use relatively small quantities of rubber, for example, on the order of 0.25 to 2% by weight, although larger quantities, such as 5%, or even as high as 10% by weight, may advantageously be added to the wax. In incorporating rubber in wax to produce my novel composition, it may be added as rubber latex, an emulsion of crude rubber in water, or as a solution of refined rubber, preferably unvulcanized, in a volatile solvent, such as benzol. The introduction of rubber may be effected by melting the wax, adding the rubber-containing mixture to it, and heating sufficiently to vaporize the solvent or water; when a solution of rubber in solvent is used it may be desirable to introduce steam or other distillation aids. During the incorporation of the rubber it is desirable to agitate the mixture to insure uniform distribution.

As indicated above, my novel composition of matter is particularly suitable for impregnating paper, fabric or the like, and it may also be used with advantage for other purposes, for example, as a coating for other flexible materials, such as plants, as a protection during shipment from nurseries; in fact, wax subjected to any conditions during use wherein reduced brittleness is an advantage may be improved by the addition of rubber as disclosed herein.

What I claim is:

1. The method of decreasing the brittleness of substantially oil-free petroleum wax which comprises adding from 0.25 to 2% of rubber thereto.

2. The method of preparing a high-melting, tough petroleum wax which comprises substantially completely removing from petrolatum the oil contained therein and incorporating from 0.25 to 2% by weight of rubber in the substantially oil-free wax.

HENRY J. ROSE.